June 21, 1938.  M. BERMAN ET AL  2,121,650
CONVEYER BELT
Filed April 28, 1936
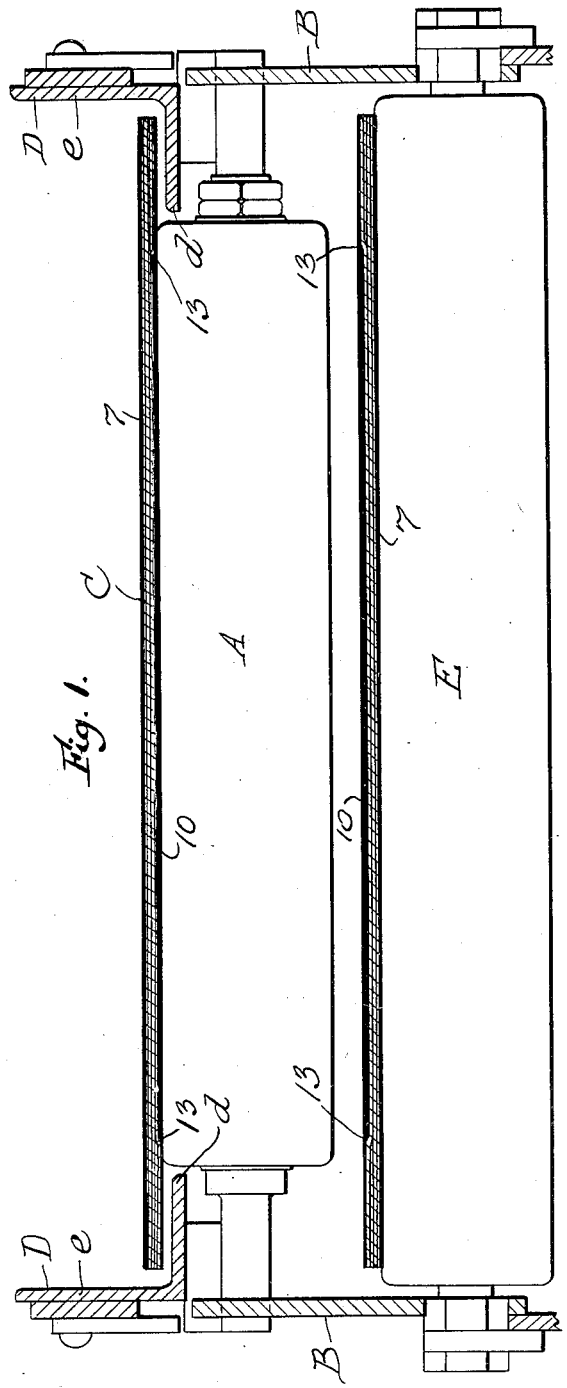
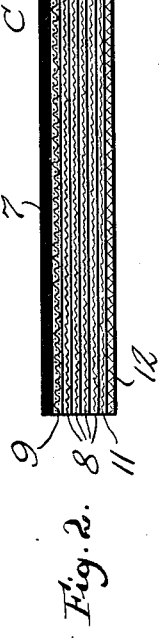
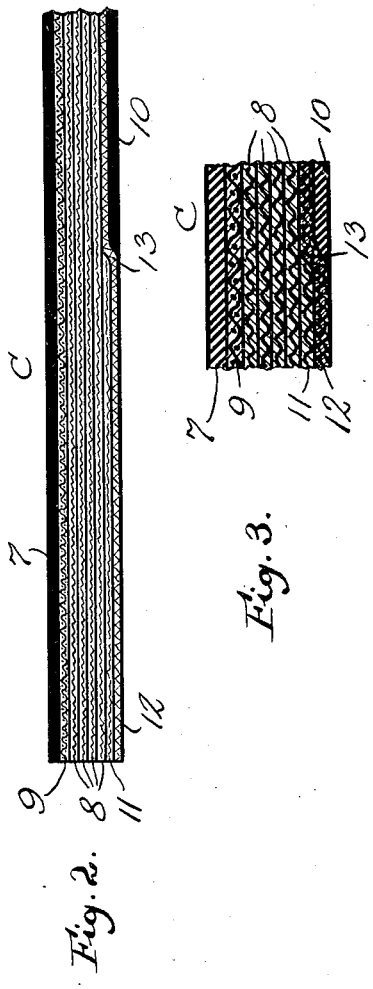
INVENTOR
Michael Berman
Theodore C. Zinter
Parker, Prochnow & Farmer
ATTORNEYS Patented June 21, 1938

2,121,650

UNITED STATES PATENT OFFICE 2,121,650

CONVEYER BELT

Michael Berman and Theodore C. Zinter, Buffalo, N. Y., assignors to Hewitt Rubber Corporation, Buffalo, N. Y.

Application April 28, 1936, Serial No. 76,752

15 Claims. (Cl. 198—193)

This invention relates to improvements in conveyer belts of the laminated canvas and rubber type.

In certain types of conveyers the idlers or rollers which carry the conveyer belt terminate short of the edges of the belt, and stationary flanges are provided for supporting the edges of the belt when the same is loaded. Conveyers of this type are, for example, commonly used in coal mines. It has been customary in the past to use in connection with conveyers of this kind conveyer belts of the conventional type which comprise a number of layers or plys of canvas incased in rubber. It has been found that when a belt of this kind is loaded and the edges thereof bear against the stationary supports, a large amount of friction results and also the rapid wearing out of the belt.

One of the objects of this invention is to provide a conveyer belt for conveyers of this type by means of which the friction between the belt and the stationary supports for the edge portions thereof is greatly reduced and the life of the belt is increased. Another object of this invention is to provide a laminated rubber and canvas belt for use with conveyers of the kind described, in which the canvas is exposed at the edge portions of the belt which bear on the stationary supports. A further object is to provide a belt of substantially uniform thickness having a rubber layer on the pulley face thereof which terminates near the edges of the supporting idlers or rollers of the conveyer, and in which the canvas is exposed at the edge portions of the belt.

A further object of this invention is to provide a belt of novel construction which is so formed that the width of the belt can be controlled with greater accuracy than in the case of rubber covered belts heretofore made.

Still another object of this invention is to provide a conveyer belt in which the canvas exposed at the edge portion of the pulley face of the belt is of a hard duck woven with twisted threads and having a high resistance to wear. Another object is to provide a laminated rubber and canvas conveyer belt in which the edge portions of the pulley face of the belt is of bare fabric not impregnated with rubber; also to provide a conveyer belt in which the exposed fabric portions are lubricated or coated with a friction reducing material. Other objects of this invention will appear from the following description and claims.

In the accompanying drawing:

Fig. 1 is a transverse sectional elevation of a part of a conveyer provided with a belt embodying this invention.

Fig. 2 is a fragmentary view of an end or transverse edge of the conveyer belt.

Fig. 3 is a similar fragmentary sectional elevation thereof on a still larger scale.

The conveyer in connection with which our improved belt may advantageously be used, includes the usual driving pulleys not shown, and a series of rollers or idlers which support the belt intermediate of the pulleys. For example, the upper or load carrying run of the conveyer belt is supported by idlers or rollers A, one of which is shown in Fig. 1. These rollers are journalled at their ends in a frame member B. This frame member also includes a pair of longitudinally extending angle bars D, the lower flanges $d$ of which extend below the edges of the conveyer belt in position to support the same in case the edges are bent down by the load carried by the belt. The upwardly extending legs $e$ of the angle bars are arranged in position to help keep the material conveyed by the belt from falling beyond the edges thereof and also serves to hold the belt in approximately correct relation to the supporting rollers A. The return run of the belt is supported by another series of idlers or rollers E which are also suitably journalled in frame B of the conveyer.

When the belt is lightly loaded or when the load is all distributed in the middle portion of the belt, the edges thereof will, of course, be spaced above the flanges $d$ of the angle bars. When, however, the load is partly supported by edge portions of the belt, it will be obvious that these edge portions will be bent downwardly until they bear on the flanges $d$ of the stationary angle bars. This will cause friction between the belt and these flanges of the angle bars, and when the edge portions of the belt are covered with rubber, a very high friction results. Furthermore, the belt will inevitably move laterally of the conveyer to some extent so that the edges of the belt will at times bear against the upright legs or flanges $e$ of the angle bars and when these edges are covered with rubber, as has heretofore been common practice in connection with belts used on these conveyers, further high friction will result. The friction between the edge portions of the belt and the stationary supports not only materially increases the amount of power necessary to drive the belt, but also tends to rapidly wear out the edge portions of the belt.

We have found that the power required to operate the belt can be greatly reduced and the life of the belt increased by so constructing the belt that the canvas or fabric will be exposed at the edge portions of the lower or pulley face of the belt which may bear against horizontal supporting surfaces, such as the legs d of the angle bars D. If desired, a further reduction in friction and increase in the life of the belt may be effected by so constructing the belt that the edges of the canvas plies of the belt will also be exposed at the edges of the belt. The upper or load carrying face of the belt is preferably formed entirely of rubber, since, of course, the rubber surface offers very high resistance to cutting, abrasion and other damage by the coal or other hard material which may be carried on the belt and the greater portion of the lower or pulley face of the belt which bears against the pulleys is also formed of rubber, so that the increased frictional properties of the rubber may be used to advantage for transmitting driving power to the belt.

In order to produce the desired results, the belt may be constructed in any suitable manner, and in the construction shown, the belt C is provided on its upper or load bearing face with a sheet or layer 7 of rubber, which preferably extends from edge to edge thereof, and 8 represents a series of plies or layers of canvas or fabric. Preferably a breaker strip 9 of fabric provided with relatively large openings through which the rubber may extend is provided between the upper rubber layer 7 and the fabric layers 8. 10 represents the rubber layer or ply on the lower or pulley face of the belt, the edges of which terminate at distances from the edges of the belt sufficient to permit the canvas to be exposed on this surface of the belt for a sufficient distance to afford canvas bearing faces which cooperate with the stationary belt supports of the conveyer. Preferably, the rubber layer 10 is of less width than the width of the rollers A so that when the edges of the belt are bent downwardly by the load carried by the belt, the bending of the belt will not take place at the edges of the lower rubber sheet or ply 10, thereby reducing the tendency of the rubber and fabric to become separated or broken away from each other at the edges of the rubber layer 10.

It is, of course, desirable that the belt should be of uniform thickness throughout its width and in order to compensate at the edge portions of the belt for the thickness of the rubber layer or ply 10, an additional strip of any suitable material, such as canvas, rubber, or the like, may be employed at each edge portion of the belt. Such strips may be positioned in any desired manner in relation to the other plys or layers of the belt. It is preferable, however, particularly if a rubber strip is used, to place the same between some of the canvas or fabric layers which extend from edge to edge of the belt so that there will be less tendency of these narrow edge strips to become separated from other parts of the conveyer belt. In the construction shown for this purpose, a fabric strip 11 is arranged at each edge of the belt and extends approximately from the edges of the rubber ply or layer 10 to the adjacent outer edge of the belt. These strips in the construction illustrated are placed between some of the layers of fabric which extend from edge to edge of the belt, for example, as shown in Figs. 1 and 2 between the lower canvas layer or ply 12 and the next adjacent one. Consequently, the lower strip or ply of canvas is provided at 13 with a bend or offset to compensate for the thickness of the narrow strip 11.

In order to further increase the wear resistance of the belt, one or more of the plies or layers of canvas, particularly the lower layer 12 may be made of a hard duck, which is closely woven with twisted threads. This type of duck, which is well known in the trade, we have found to offer exceptionally good resistance to wear on belts of the kind herein described, when rubbing against stationary supports. If desired, all of the layers of canvas may be made of this hard duck, as well as the narrow edge strips 11.

The fabric or canvas used in these belts, except as hereinafter specified, is preferably thoroughly rubberized or frictioned or impregnated with rubber as is the usual custom in the manufacture of conveyer belts, and if desired, thin surface coats or layers of rubber may be applied to the surfaces of the canvas. Consequently, when the belts are being made, the several layers or plys of canvas and rubber are positioned in correct relation to each other and then vulcanized together under heat and pressure in the usual manner to form a substantially unitary belt.

If it is desired to reduce still further the friction between the belt and the stationary parts of the conveyer, the upper layer 7 of rubber may terminate at the edges of the belt, and consequently, the edges of the canvas plys of the belt will not be covered with the usual sheet or layer of rubber as in belts heretofore made. These exposed edges when bearing against the upright legs e of the angle bars, offer much less frictional resistance and are subject to much less wear than when the edges of the belts are covered with sheets of the rubber. In order to prevent rapid deterioration of the belts by moisture entering into the fabric at the edges of the belts, each belt after it has been vulcanized is preferably rolled into a roll and the opposite edges are then painted or otherwise coated with a rubber cement. The edges are then cured by means of hot plates which vulcanize or cure the rubber cement at the edges of the belt. This cement is in relatively thin liquid form and penetrates into the fabric and renders the same waterproof. The quantity of rubber present in the canvas at the edges of the belt resulting from this treament is not enough to produce any material increase in the coefficient of friction of the canvas with relation to the stationary supports, and presumably at the bearing surfaces of the edges, the rubber cement becomes quickly separated from the fabric by friction.

In addition to the advantages which have already been specified, belts of this kind can be made with much greater accuracy than belts as heretofore made in which sheets of rubber extended around the edges of the fabric portions of the belt. This is due to the fact that the width of the canvas in the ultimate belt can be readily controlled by cutting the canvas initially of a uniform and correct width, allowance being made for stretching of the belt during manufacture. Furthermore, a belt of this kind can be trimmed at the edges thereof by cutting away portions of the edges, which will in no way damage the belt. In belts as heretofore made, the thickness of the rubber sheet at the edges of the belt could not be definitely controlled, and furthermore, the cutting of this rubber sheet was avoided because of the danger of cutting away an excessive amount of rubber, thus leaving canvas exposed at the edges. By means of the impregnation of these edges with rubber cement as has been herein described, the danger of penetration of moisture into the ends of the fibers is eliminated.

In the use of belts made in accordance with this invention, it has been found that the exposed fabric portions of the belt during continued use of the belt acquire a glaze which helps to still further reduce the coefficient of friction between the canvas and the stationary supporting surface. When the conveyer is used in connection with soft coal, fine particles of the coal entering between the belt and the legs $d$ of the angle bars become ground up or crushed and work into the interstices of the canvas, and thus produce a carbon glaze on the belt, which is very effective in reducing friction, and which consequently also prolongs the life of the belt by reducing the wearing away of the canvas by friction. Rubber, on the other hand, never acquires a glaze by wear, and furthermore, the small particles of pulverized coal cannot become embedded in the rubber to form a smooth bearing face of low friction. When belts embodying this invention are used for conveying materials other than coal, the coefficient of friction of the belt can be reduced by rubbing graphite or other friction reducing material on the canvas edge portions of the belt.

In the manufacture of laminated belts, it is customary to impregnate or fill both faces of each fabric layer or ply with uncured rubber, so that the several plies can be vulcanized together. In our improved belt, if desired, the lower face of the bottom layer of canvas or fabric may be left bare or unrubberized at the exposed edge portions thereof. A belt so made will avoid the slight friction resulting from the small quantity of rubber driven into the canvas by rubberizing the same. When it is desired to have the bare canvas exposed at the edge portions of the pulley face, this can be most readily accomplished by rubberizing only the upper face of the lower ply or layer 12, thus leaving the entire lower face of this ply of bare canvas. This will in no way interfere with the vulcanization of the lower rubber layer 10 thereto. The exposed bare edge portions of the lower face of the belt can then be treated with graphite, waxy materials, or other friction reducing agents.

Because of the foregoing facts, belts made in accordance with this invention have a much longer life than belts as heretofore used in which the canvas was completely covered by or encased in rubber. Furthermore, our improved belts operate at a material saving in the cost of the power to drive them. Such belts also are very superior to belts made entirely of canvas, for the reason that the sharp particles of coal or other material carried by the belts tend to cut the fibers of the canvas so that the same rapidly wears out. The rubber sheet or covering 7 because of its resiliency offers a very high degree of resistance to cutting by such sharp particles. Furthermore, the lower layer of rubber 10 is desirable for the same reason, since any sharp particles which might drop on the lower face of the belt and enter between the belt and the pulleys would tend to cut the canvas. The lower layer 10 on the pulley side of the belt also provides the desired friction between the driving pulley and the belt.

The word "canvas" is used in the claims to designate any fabric which may be used for reinforcing a conveyer belt.

We claim as our invention:

1. A laminated rubber and canvas conveyer belt for use in a conveyer having idler rollers, the ends of which terminate short of the edges of the conveyer belt and having stationary surfaces for supporting the edges of the belt, said belt having the same thickness from side to side and formed of laminations of fabric layers disposed face to face, the roller engaging face of the belt having its fabric exposed in the side marginal zones between the ends of the rollers and the adjacent side edges of the belt, the remainder of the roller engaging face of the belt and the entire conveying face of the belt having rubber layers.

2. A laminated rubber and canvas conveyer belt for use in a conveyer having idler rollers, the ends of which terminate short of the edges of the conveyer belt and having stationary surfaces for supporting the edges of the belt, said belt being of approximately the same thickness from side edge to side edge and having its upper load bearing face covered with a layer of rubber and having a layer of rubber of less width on its lower face, the marginal zones, bordering the side edges, of the lower face of the belt being of canvas, the joint between the rubber and canvas of said lower layer being arranged inwardly from the ends of the rollers.

3. A laminated rubber and canvas conveyer belt of approximately the same thickness from side edge to side edge, and of the type for conveying materials such as coal, ores and crushed stone and having a plurality of intermediate layers of canvas which are rubberized on opposite faces and vulcanized together, a lower layer of canvas having marginal zones bordering the side edges of the pulley engaging face thereof bare, and a rubber layer vulcanized to said pulley engaging face thereof and extending solely between said bare zones.

4. In a conveyer of the type in which materials such as coal, ores and crushed stone are conveyed on a stretch of endless belting extending between and passing over pulleys, which stretch is supported at intervals between said pulleys on rollers, and along its edges, when they sag, by walls extending beneath side marginal zones of said stretch, and guided against excessive lateral movement by walls extending along the side edges of said stretch, the improved conveyer belt therefor which has uniform thickness throughout and comprises a plurality of plies of fabric secured together face to face, and a layer of rubber on each face of the body of connected plies, the rubber layer on the conveying face of the belt being coextensive with that entire face, and the opposite face of the belt being free of the rubber layer of that face along the side zones engageable with said supporting wall, the fabric of said plies being bare and fully exposed along the side edges of said belt, whereby the conveying face will be fully protected by a rubber layer, the pulley engaging face will be rubber covered, and the face areas of all wall engaging zones will be free of any rubber layers.

5. In a conveyer of the type in which materials such as coal, ores and crushed stone are conveyed on a stretch of endless belting extending between and passsing over pulleys, which stretch is supported at intervals between said pulleys on rollers, and along its edges, when they sag, by walls extending beneath side marginal zones of said stretch, and guided against excessive lateral movement by walls extending along the side edges of said stretch, the improved conveyer belt therefor which has uniform thickness throughout and comprises a plurality of plies of fabric secured together face to face, successive plies being discontinuous with one another along the side edges of the belt, the fabric of said plies being bare and exposed along the side edges of the belt and along a marginal zone bordering each side edge on the pulley engaging face of the belt, the conveying face of the belt and the portion of the pulley engaging face between said marginal zones being coated with a layer of rubber of substantial thickness.

6. In a conveyer of the type in which materials such as coal, ores and crushed stone are conveyed on a stretch of endless belting extending between and passing over pulleys, which stretch is supported at intervals between said pulleys on rollers, and along its edges, when they sag, by walls extending beneath side marginal zones of said stretch, and guided against excessive lateral movement by walls extending along the side edges of said stretch, the improved conveyer belt therefor which has uniform thickness throughout and comprises a plurality of plies of fabric secured together face to face, successive plies being discontinuous with one another along the side edges of the belt, the fabric of said plies being bare and exposed along the side edges of the belt and along a marginal zone bordering each side edge on the pulley engaging face of the belt, the conveying face of the belt and the portion of the pulley engaging face between said marginal zones being coated with a layer of rubber of substantial thickness, the outer fabric ply on the pulley engaging face of the belt in said marginal zones being offset outwardly in a direction normal to that face sufficiently to make the outer face of the offset portions approximately flush with the outer face of the pulley engaging rubber layer, and an interponent layer between said offset portions and the next adjacent fabric ply for filling the space between them.

7. In a conveyer of the type in which materials such as coal, ores and crushed stone are conveyed on a stretch of endless belting extending between and passsing over pulleys, which stretch is supported at intervals between said pulleys on rollers, and along its edges, when they sag, by walls extending beneath side marginal zones of said stretch, and guided against excessive lateral movement by walls extending along the side edges of said stretch, the improved conveyer belt therefor which has substantially uniform thickness throughout and comprises a plurality of plies of fabric secured together face to face, successive plies being discontinuous with one another along the side edges of the belt, the fabric of said plies along a marginal zone bordering each side edge on the pulley engaging face of the belt being free of any rubber coating of any substantial thickness, the conveying face of the belt and the portion of the pulley engaging face between said marginal zones being coated with a layer of rubber of substantial thickness, the side edges of the belt having a temporary coating of vulcanized rubber cement sufficient to waterproof the same.

8. A laminated rubber and convas conveyer belt of substantially the same thickness throughout and having a plurality of layers of canvas disposed face to face with one another and extending from edge to edge of said belt, the canvas layer nearest to the pulley face of said belt being of a hard, closely woven duck with twisted threads, the pulley face of said belt being covered with a layer of rubber between marginal zones of substantial width extending along and adjoining opposite side edges of said belt on the pulley engaging face thereof, said zones being free of said layer, leaving said nearest canvas layer exposed on the pulley engaging face, said hard duck layer being bent at the edges of said rubber layer into the plane of said pulley face and forming substantially a continuation of said rubber layer, and an interponent strip of approximately the width of each of said zones and thickness of said layer of rubber disposed between the bent portion of said hard duck layer and the next adjacent internal layer, to equalize the thickness of said belt from side edge to side edge.

9. A laminated rubber and canvas conveyer belt of substantially the same thickness throughout and having a plurality of layers of canvas disposed face to face and extending from edge to edge of said belt, the canvas layer nearest to the pulley face of said belt being of a hard, closely woven duck with twisted threads, a layer of rubber covering the pulley face of said belt between narrow marginal zones along opposite side edges of that face, said zones on the pulley face being free of said layer, said hard duck layer being bent at the edges of said rubber layer into the plane of said pulley face and forming substantially a continuation of said rubber layer, and strips of canvas of less width than said belt disposed along opposite side edges of said belt, extending from the edges of said belt to the longitudinal portions thereof at the nearest margin of said rubber layer, and arranged between two of said layers of canvas.

10. A laminated rubber and canvas conveyer belt of substantially the same thickness throughout and having a layer of rubber covering the pulley face thereof between narrow marginal zones along and adjoining opposite side edges of that face, said face being free of said rubber layer in said zones, leaving canvas exposed on said pulley face from the side edges of the belt to the inner margins of the adjacent zones and strips of canvas of less width than said belt disposed at opposite sides of said belt and extending from the edges of the belt to approximately the portion thereof at the nearest margin of said layer of rubber, the edges of said canvas extending to the extreme edges of said belt and being exposed on the side edges to form bearing faces of low coefficient of friction.

11. In a conveyer of the type in which materials such as coal, ores and crushed stone are conveyed on a stretch of endless belting extending between and passing over pulleys, which stretch is supported at intervals between said pulleys on rollers, and along its edges, when they sag, by walls extending beneath side marginal zones of said stretch, and guided against excessive lateral movement by walls extending along the side edges of said stretch, the improved conveyer belt therefor which comprises a plurality of plies of canvas disposed face to face, discontinuous from one another at the side edges of the belt, and having their contacting faces rubberized and vulcanized together, a layer of rubber vulcanized to the pulley engaging face of the canvas ply nearest that face, said pulley engaging face being free of said layer along marginal zones bordering the opposite side edges of said belt, both faces of said belt being approximately flat from side edge to side edge, and the side edges having the canvas plies bare and exposed therethrough.

12. In a conveyer of the type in which materials such as coal, ores and crushed stone are conveyed on a stretch of endless belting extending between and passing over pulleys, which stretch is supported at intervals between said pulleys on rollers, and along its edges, when they sag, by walls extending beneath side marginal zones of said stretch, and guided against excessive lateral movement by walls extending along the side edges of said stretch, the improved conveyer belt therefor which has uniform thickness throughout and comprises a plurality of plies of fabric secured together face to face, a layer of rubber on each face of the body of connected plies, the rubber layer on the conveying face of the belt being coextensive with that entire face, and the opposite face of the belt being free of said rubber layer of that face along the side zones engageable with said supporting wall, the fabric of said plies being free of said rubber layers, along the side edges of said belt, whereby the conveying face will be fully protected by a rubber layer, the pulley engaging face will be rubber covered, and the face areas of all wall engaging zones will be free of any rubber layers, and a film of friction reducing material applied to the fabric at the side edges and along the marginal zones.

13. A laminated rubber and canvas conveyer belt of substantially the same thickness throughout and having its conveying face substantially entirely covered with a rubber layer and the greater portion of the pulley engaging surface thereof covered with a rubber layer, the pulley engaging face of said belt being free of said rubber layer from the side edges for marginal zones of substantial width, the side edges of said belt and said marginal zones on the pulley face of said belt adjacent to and adjoining said edges having the fabric of the belt exposed.

14. A belt according to claim 13 in which the canvas exposed on the marginal zones of the pulley face is closely woven with twisted threads.

15. A laminated rubber and canvas conveyer belt of substantially the same thickness throughout and having its conveying face substantially entirely covered with a rubber layer and the greater portion of the pulley engaging surface thereof covered with a rubber layer, the pulley engaging face of said belt being free of said rubber layer from the side edges for marginal zones of substantial width, the marginal zones on the pulley face of said belt adjacent to and adjoining the side edges of the belt having the fabric of the belt exposed and said side edges having a temporary coating of a vulcanized rubber cement to waterproof the same.

MICHAEL BERMAN.
THEODORE C. ZINTER.